(12) United States Patent
Chen et al.

(10) Patent No.: US 7,920,222 B2
(45) Date of Patent: Apr. 5, 2011

(54) LCD AND BACKLIGHT MODULE, FRONT FRAME, AND BACK BEZEL THEREOF

(75) Inventors: Chih-Chia Chen, Hsinchu (TW);
Chien-Yuan Chen, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 397 days.

(21) Appl. No.: 12/044,029

(22) Filed: Mar. 7, 2008

(65) Prior Publication Data
US 2009/0122217 A1    May 14, 2009

(30) Foreign Application Priority Data

Nov. 13, 2007    (TW) ................................ 96142804 A

(51) Int. Cl.
*G02F 1/1333* (2006.01)
*H02B 1/01* (2006.01)
*G09F 13/04* (2006.01)

(52) U.S. Cl. ............ 349/58; 349/61; 361/829; 362/97.2
(58) Field of Classification Search ................. 349/58, 349/61; 361/829; 362/97.2
See application file for complete search history.

(56) References Cited

U.S. PATENT DOCUMENTS

| | | | | |
|---|---|---|---|---|
| 7,626,654 B2 * | 12/2009 | Tsubokura et al. | ............. | 349/60 |
| 7,649,588 B2 * | 1/2010 | Hisada | ............. | 349/58 |
| 2006/0133018 A1 * | 6/2006 | Okuda | ............. | 361/681 |

FOREIGN PATENT DOCUMENTS

| | | |
|---|---|---|
| CN | 2669361 | 1/2005 |
| CN | 1779527 | 5/2006 |
| CN | 2896444 | 5/2007 |
| CN | 1987596 | 6/2007 |
| TW | M322558 | * 11/2007 |

OTHER PUBLICATIONS

English language translation of abstract of CN 2669361 (published Jan. 5, 2005).
English language translation of abstract of CN 1779527 (published May 31, 2006).
English language translation of abstract of CN 2896444 (published May 2, 2007).
English language translation of abstract of CN 1987596 (published Jun. 27, 2007).
English Abstract of TW M322558, Nov. 21, 2007.

* cited by examiner

*Primary Examiner* — Mike Qi
(74) *Attorney, Agent, or Firm* — Thomas | Kayden

(57) ABSTRACT

A liquid crystal display (LCD) includes a backlight module, a cell module installed in front of the backlight module, and a front frame which includes a frame body with holes and buffer material. The buffer material has a first part disposed in the holes and fixed to the cell module and backlight module through the front frame, and a second part sandwiched between the frame body and cell module. A method for manufacturing a LCD device is also provided, including forming a buffer material on a frame body by injection molding, firmly connecting the frame body, a cell module, and a backlight module, and locating the buffer material between the frame body and cell module.

21 Claims, 18 Drawing Sheets

US 7,920,222 B2

LCD AND BACKLIGHT MODULE, FRONT FRAME, AND BACK BEZEL THEREOF

BACKGROUND OF THE INVENTION

1. Field of the Invention

The invention relates to an LCD, and more particularly, to a backlight module, a front frame and a back bezel thereof, and a method for manufacturing the LCD.

2. Description of the Related Art

Referring to FIG. 1a, a conventional liquid crystal display (LCD) mainly includes a front frame 110, a liquid crystal array cell module 120 and a backlight module 130. The front frame 110 is used for firmly combining the liquid crystal array cell module 120 and the backlight module 130. A soft adhesive material, attached to a front surface of the frame body 112 of the front frame 110, serves as buffer material 111 between the frame body 112 and the liquid crystal array cell module 120 as shown in FIGS. 1b and 1c. FIGS. 1b and 1c are the top view and bottom view of the front frame 110, respectively. Generally, the buffer material 111 is a double-sided adhesive tape. Sticking the adhesive tape on the front frame body 112 requires a lot of time and attention to avoid position shift, which negatively affects the optical performance of LCD display and raises a reliability issue during later usage.

Referring to FIG. 2a, the LCD backlight module includes a frame 131, a light guide plate 132, light sources 133, a reflector sheet 134 and a back bezel 135. By integrating the frame 131 and back bezel 135 tightly, the light guide plate 132, light source 133 and reflector sheet 134 are combined firmly. Generally, a protective film 1352 is attached to the back bezel body 1351 of the back bezel 135 as shown in FIG. 2b, to avoid crumbing caused by the friction between the back bezel body 1351 and some other parts during the assembly process. Crumbing negatively affects display quality. Currently, protective film attachment is done by operators manually, thus, requiring a lot of manpower and manufacturing costs as the attachment area is pretty large.

BRIEF SUMMARY OF THE INVENTION

A detailed description is given in the following embodiments with reference to the accompanying drawings.

The present invention provides a backlight module and a method for manufacturing an LCD device. According to one embodiment, a liquid crystal display device includes a backlight module, a liquid crystal array cell module disposed in front of the backlight module and a front frame. The front frame includes a front frame body and a buffer material, the front frame body has a plurality of holes, the buffer material includes a first portion and a second portion, the first portion is disposed in the holes, the front frame firmly connects the liquid crystal array cell module and the backlight module, and the second portion is connected to first portion and disposed between the front frame body and the liquid crystal array cell module. The front frame body includes a plurality of side frames and corners where the side edges connect. The first portion is disposed on the side edges or corners of the front frame body.

An embodiment of the method for fabricating a liquid crystal display device comprising forming a buffer material on a front frame by injection molding and firmly connecting a liquid crystal array cell module and a backlight module by the front frame, with the buffer material sandwiched between the front frame and the liquid crystal array cell module.

In another embodiment of the invention, a backlight module comprises a light source, a light guide plate disposed in front of the light source and a back bezel including a back bezel body and buffer material, wherein the back bezel body has a plurality of hole, the buffer material comprises a first portion and a second portion, the first portion is disposed in the holes, the back bezel firmly connects the light source and the light guide plate, and the second portion is connected to the first portion and disposed between the back bezel body and the light source.

BRIEF DESCRIPTION OF THE DRAWINGS

The invention can be more fully understood by reading the subsequent detailed description and examples with references made to the accompanying drawings, wherein:

FIG. 8b is a partially enlarged sectional view of the region a in FIG. 8a.

FIG. 9b is a partially enlarged sectional view of the region b in FIG. 9a.

FIG. 12b is a partially enlarged sectional view of the region c in FIG. 12a.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
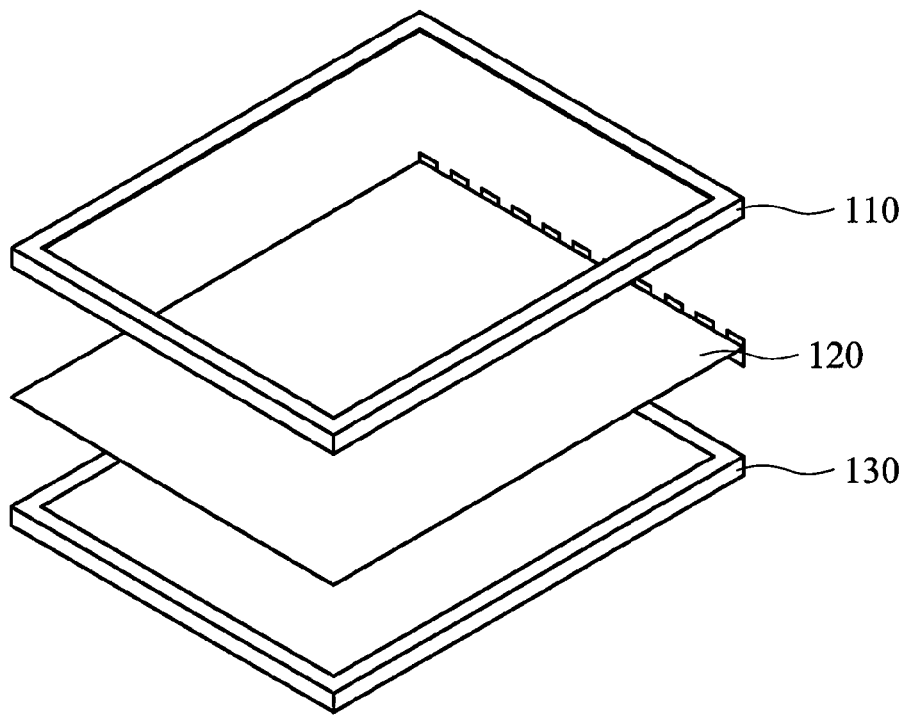
FIG. 1a is a schematic view showing the LCD structure in the prior art.
Figure 1B:
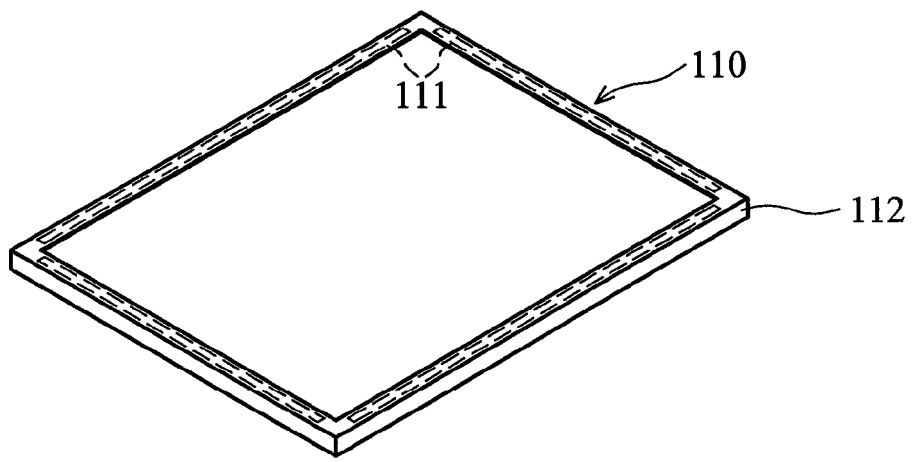
FIG. 1b is a top view showing the front frame structure in the prior art.
Figure 1C:
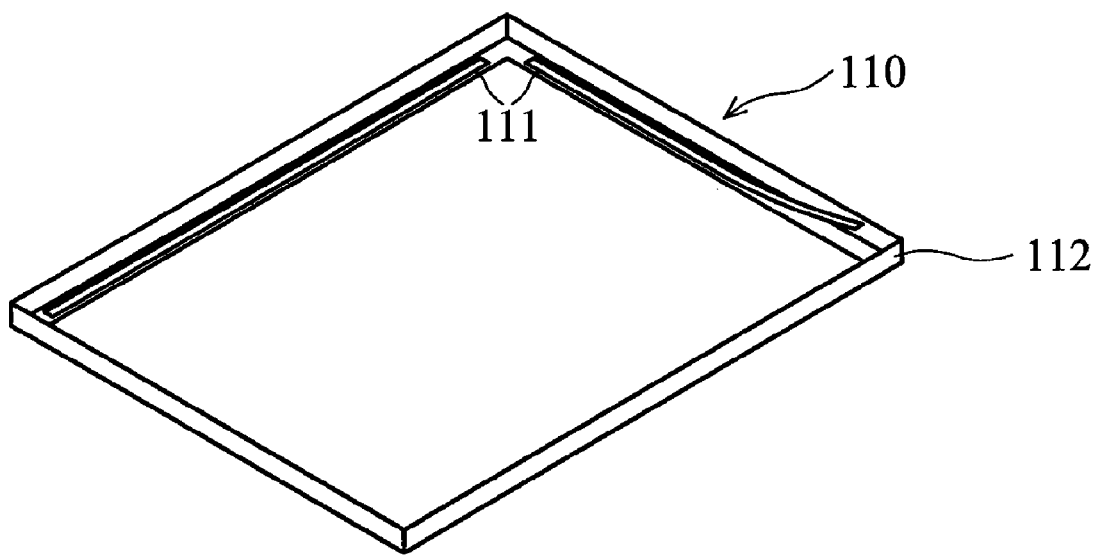
FIG. 1c is a bottom view showing the front frame structure in the prior art.
Figure 2A:
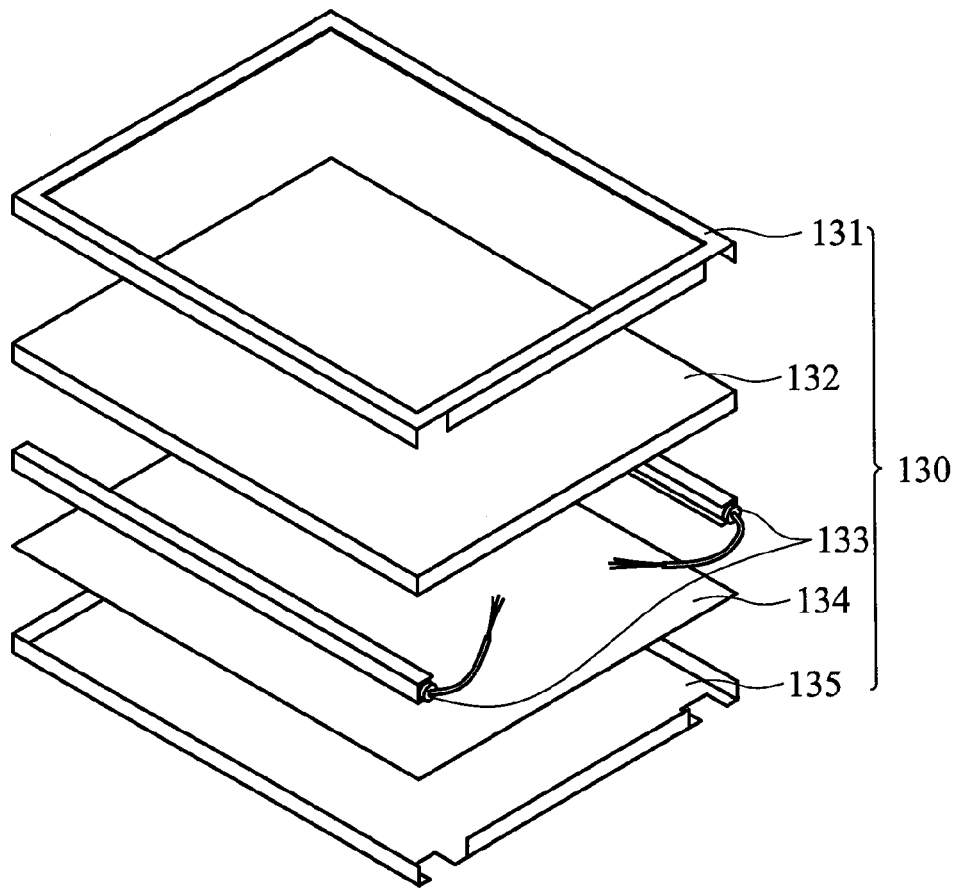
FIG. 2a is a schematic view showing the backlight structure in the prior art.
Figure 2B:
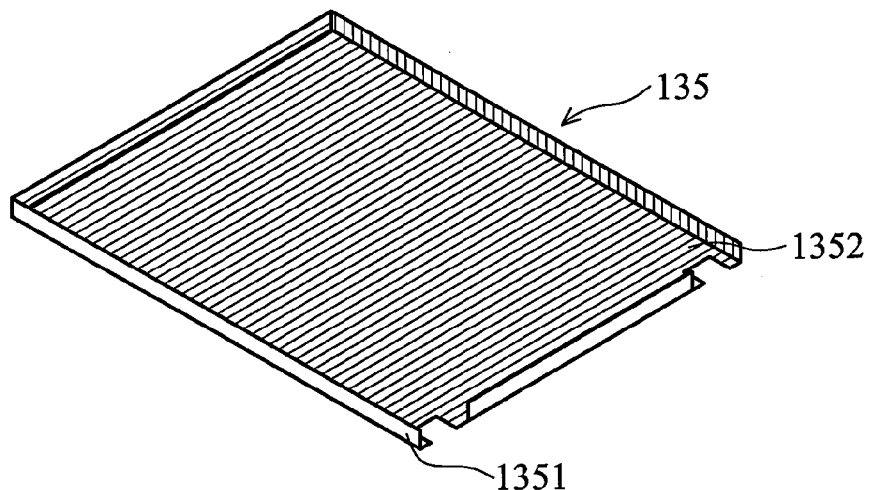
FIG. 2b is top view showing the back bezel structure in the prior art.
Figure 3:
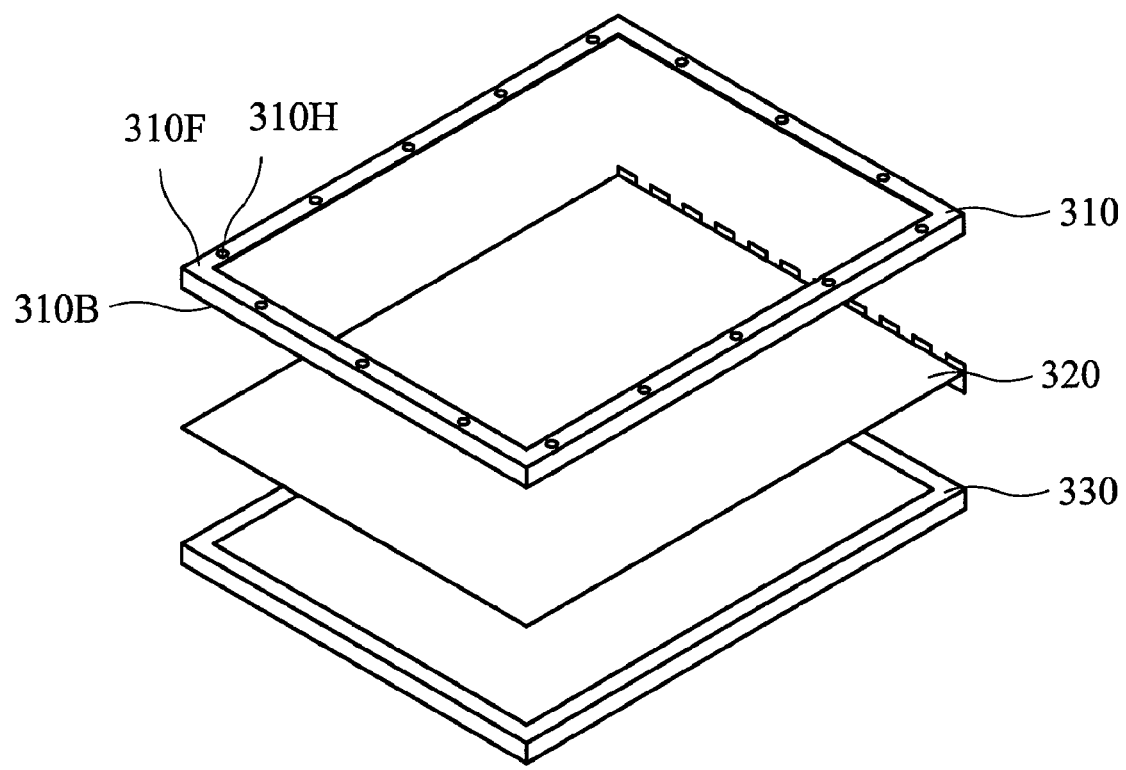
FIG. 3 is a schematic view showing the structure for an LCD module according to an embodiment of the invention.

FIG. 3 is a schematic view of a liquid crystal display according to an embodiment of the present invention, wherein the liquid crystal display includes a front frame 310, a liquid crystal panel module 320 and a backlight module 330. The front frame 310 has a upper surface 310F, a lower surface 310B and at least one hole 310H. The lower surface 310B of the front frame 310 contacts the crystal panel module 320, thus, the front frame 310 combines the liquid crystal panel module 320 and the backlight module 330.

Figure 4A:
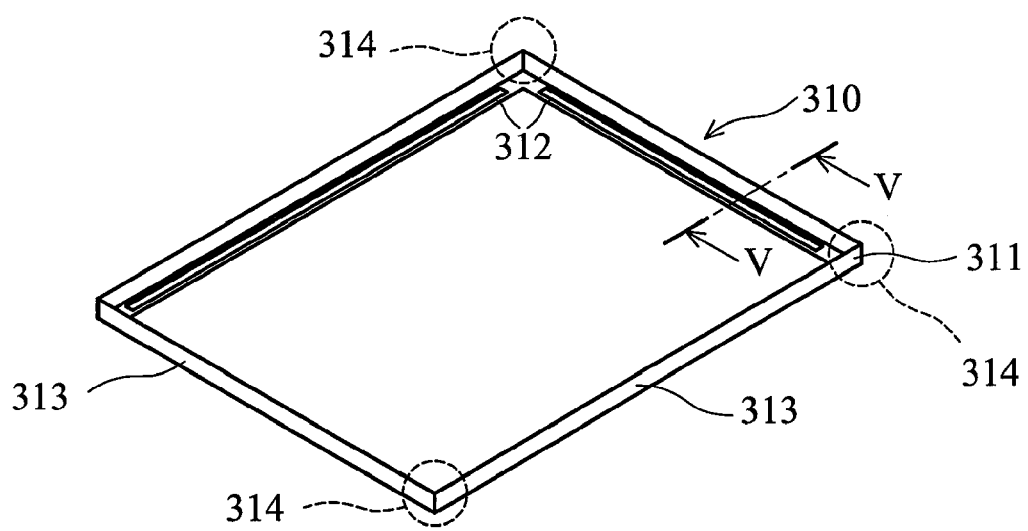
FIG. 4a is a bottom view showing the front frame structure according to an embodiment of the invention.

FIG. 4a is the bottom view showing the front frame 310 according to an embodiment of the invention, wherein the front frame 310 includes a front frame body 311 and buffer materials 312. The front frame body 311 has a plurality of side frames 313 and corners 314 where the side frames 313 connect. The buffer materials 312 are formed on the lower surface 310B of at least one side frame 313 of the frame body 311 by injection molding.

Figure 4B:
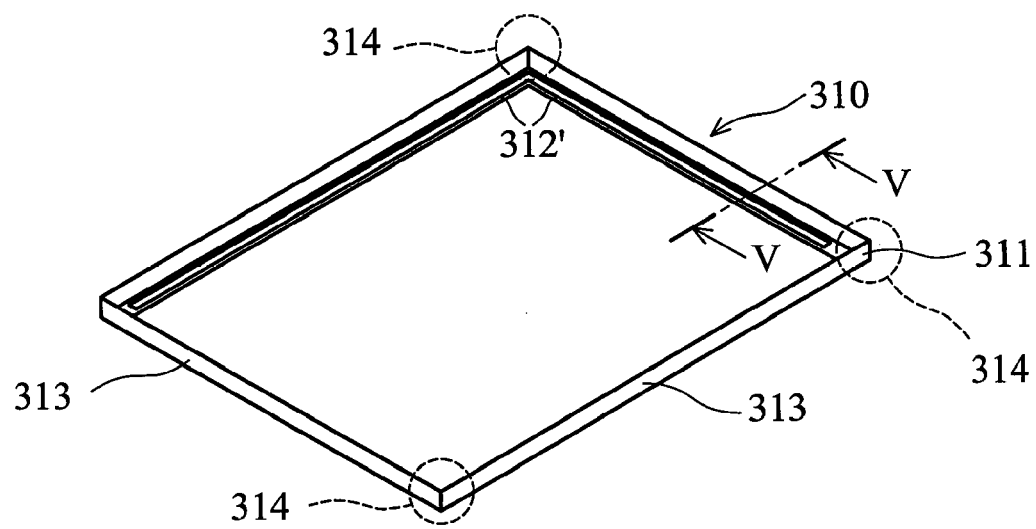
FIG. 4b is a bottom view showing the front frame structure according to another embodiment of the invention.

FIG. 4b is the bottom view showing the front frame 310 according to another embodiment of the invention, wherein the front frame body 311 has a plurality of corners 314 and side frames 313 connecting by the corners 314, and buffer materials 312' are formed on at least one side edge 313 and a corner 314 of the front frame body 311 by injection molding. The buffer materials 312 and 312' may be soft plastic. FIGS. 5a to 5i are the cross-sectional views of the front frame of FIGS. 4a and 4b taken along V-V line, respectively showing various embodiments of the invention.

Figure 5A:
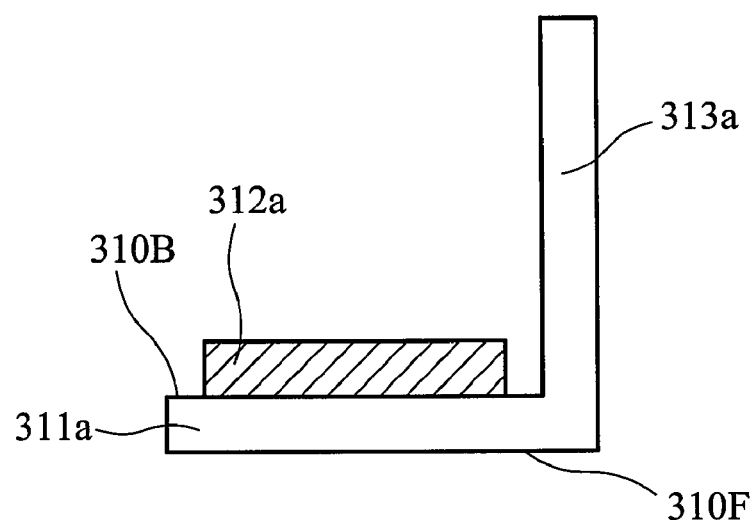
FIGS. 5a-5i depict a cross sectional views of a front frame structure of various embodiments of the invention.

FIG. 5a depicts a cross sectional view of the front frame body 310 provided with no holes. Buffer material 312a is formed on the lower surface 310B of the front frame body 311a by injection molding without contacting the side edge 313a and upper surface 310F.

Figure 5B:
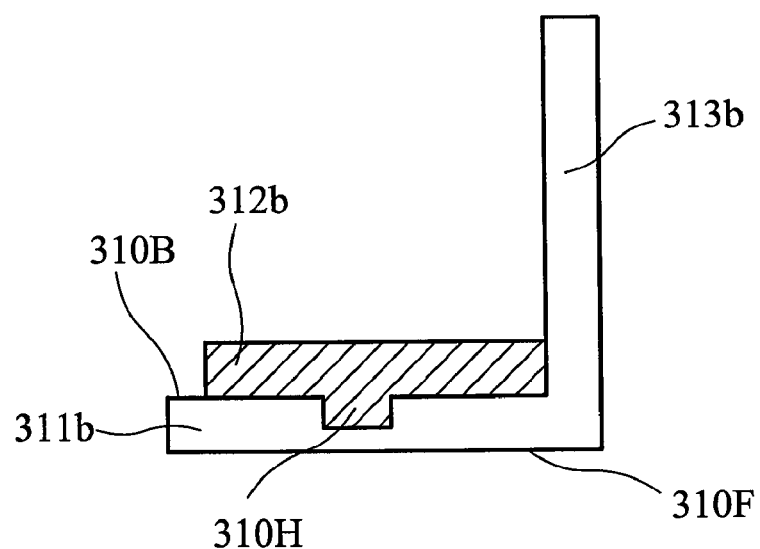

FIG. 5b depicts a cross sectional view of a modified front frame 310 provided with a blind hole 310H. Buffer material 312b is attached to the lower surface 310B of the front frame body 311b by injection molding and contacts the side edge 313b. The blind hole 310H is provided to increase the contact area between the buffer material 312b and the front frame body 311b for enhancing the attachment. Note that the blind hole 310H does not extend to the upper surface 310F.

Figure 5C:
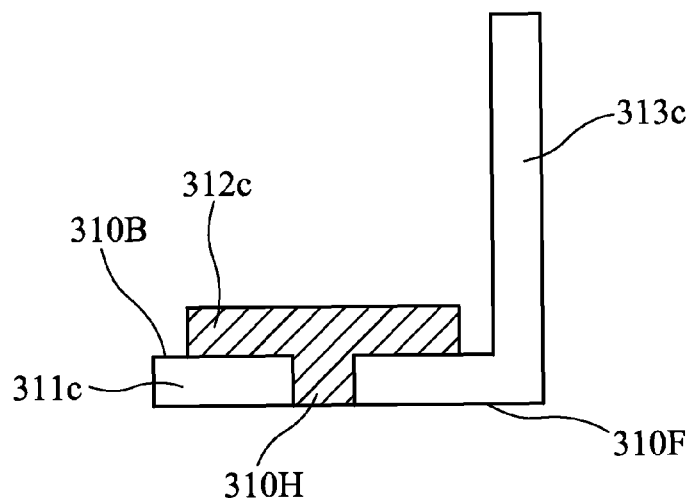

FIG. 5c depicts a cross sectional view of another modified front frame 310 having a through hole 310H. Buffer material 312c is attached to the lower surface 310B of the front frame body 311c by injection molding. It is optional that the buffer material 312c may or may not contact the side edge 313c. The through hole 310H is provided to increase the contact area between the buffer material 312c and the front frame body 311c for enhancing the attachment. Note that the buffer material 312c does not extend to the upper surface 310F.

Figure 5D:
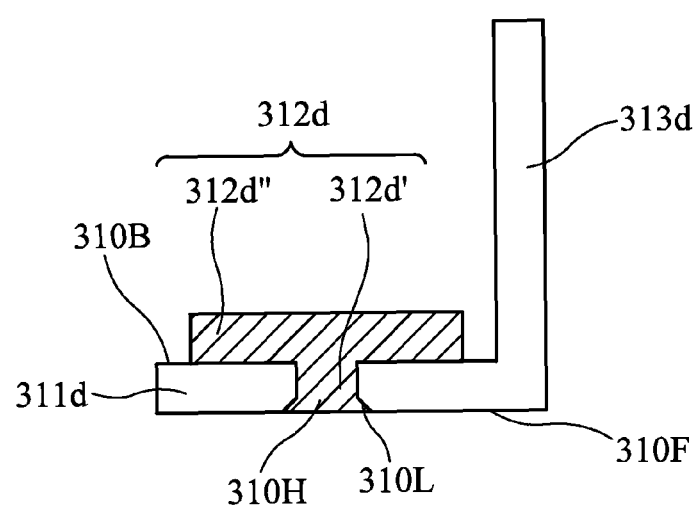

FIG. 5d depicts a cross sectional view of yet another modified front frame 310 having a through hole 310H. Buffer material 312d is attached to the lower surface 310B of the front frame body 311d by injection molding. It is optional that the buffer material 312d may or may not contact the side edge 313d. The front frame body 311d has at least one through hole 310H which is beveled at a lead angle 310L on the upper surface 310F for further increasing the contact area between the buffer material 312d and the front frame body 311d and enhancing the attachment. Note that the buffer material 312d does not extend to the upper surface 310F. Specifically, the buffer material 312d includes a first portion 312d' and a second portion 312d''. The first portion 312d' is disposed in the through hole 310H. The second portion 312d'' is connected to the first portion 312d' and disposed between the front frame body 311 and the liquid crystal panel module 320 when the liquid crystal display is assembled.

Figure 5E:
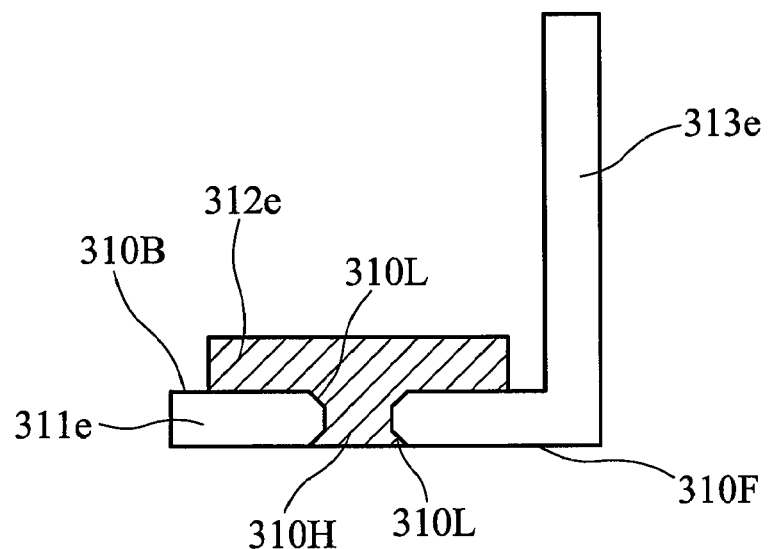

FIG. 5e depicts a cross sectional view of another modified front frame 310 having a through hole 310H. Buffer material 312e is attached to the lower surface 310B of the front frame body 311e by injection molding. It is optional that the buffer material 312e may or may not contact the side edge 313e. The through hole 310H is beveled at a lead angle 310L on both the lower surface 310B and the upper surface 310F for increasing the contact area between the buffer material 312e and the front frame body 311e and enhancing the attachment. Note that the buffer material 312e does not extend to the upper surface 310F.

Figure 5F:
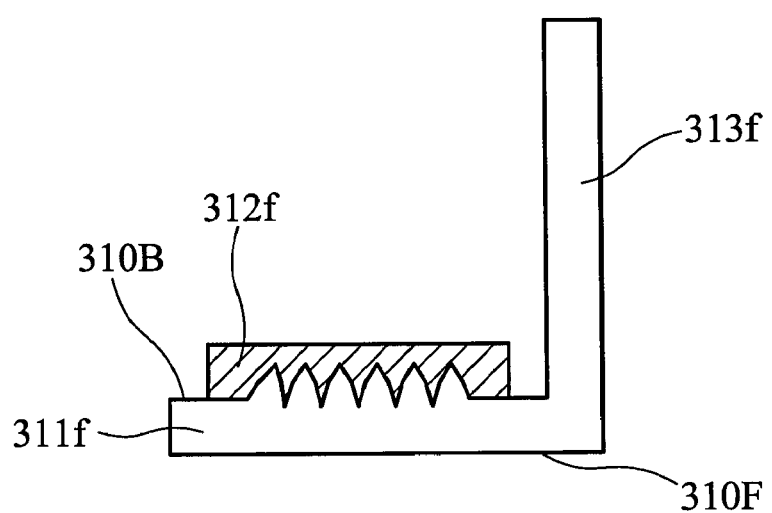

FIG. 5f depicts a cross sectional view of yet another modified front frame having no hole. Buffer material 312f is attached to the lower surface 310B of the front frame body 311f by injection molding. It is optional that the buffer material 312f may or may not contact the side edge 313f. The lower surface 310B is roughened to increase the contact area between the buffer material 312f and the front frame body 311f and enhance the attachment.

Figure 5G:
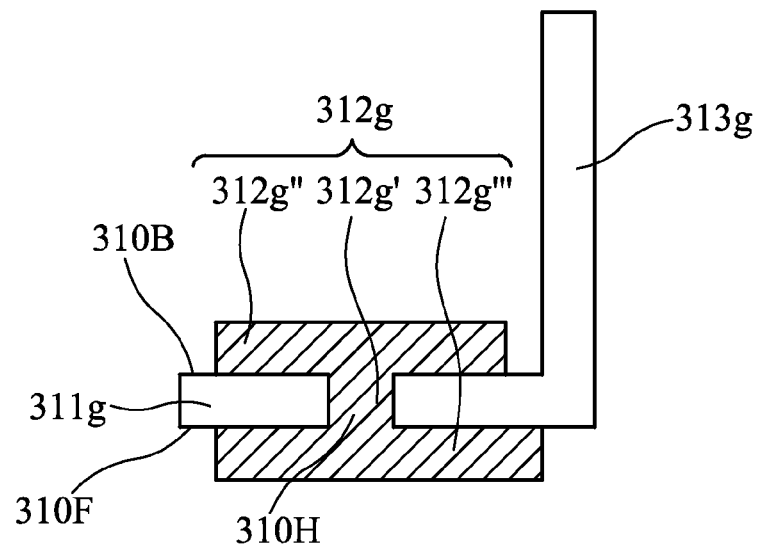

FIG. 5g depicts a cross sectional view of another modified front frame 310 having a through hole 310H. Buffer material 312g provided by injection molding extends from the lower surface 310B through the through hole 310H to the upper surface 310F for increasing the contact area and enhancing the attachment of the buffer material 312g to the front frame body 311g. It is optional that the buffer material 312g may or may not contact the side edge 313g. Specifically, the buffer material 312g includes a first portion 312g', a second portion 312g'' and a third portion 312g'''. The first portion 312g' is disposed in the through hole 310H. The second portion 312g'' is connected to the first portion 312g'. The third portion 312g''' is disposed on the upper surface 310F and connected to the second portion 312g''' through the first portion 312g'.

Figure 5H:
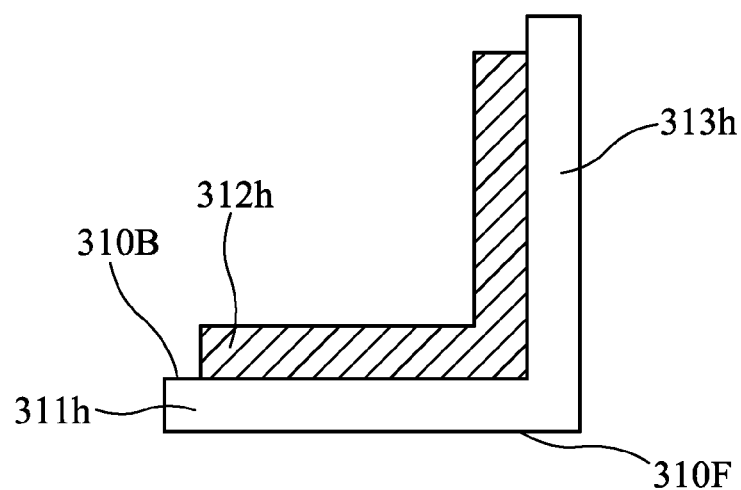

FIG. 5h depicts a cross sectional view of yet another modified front frame 310 provided with no holes. Buffer material 312h provided by injection molding is attached to the lower surface 310B of the front frame body 311h and extends to that of the side edge 313h, thereby, it is shaped as L-shaped in cross sectional view. That is, the buffer material 312h includes a first portion that is disposed on the side edges 313h and the corners of the front frame body 311 h.

Figure 5I:
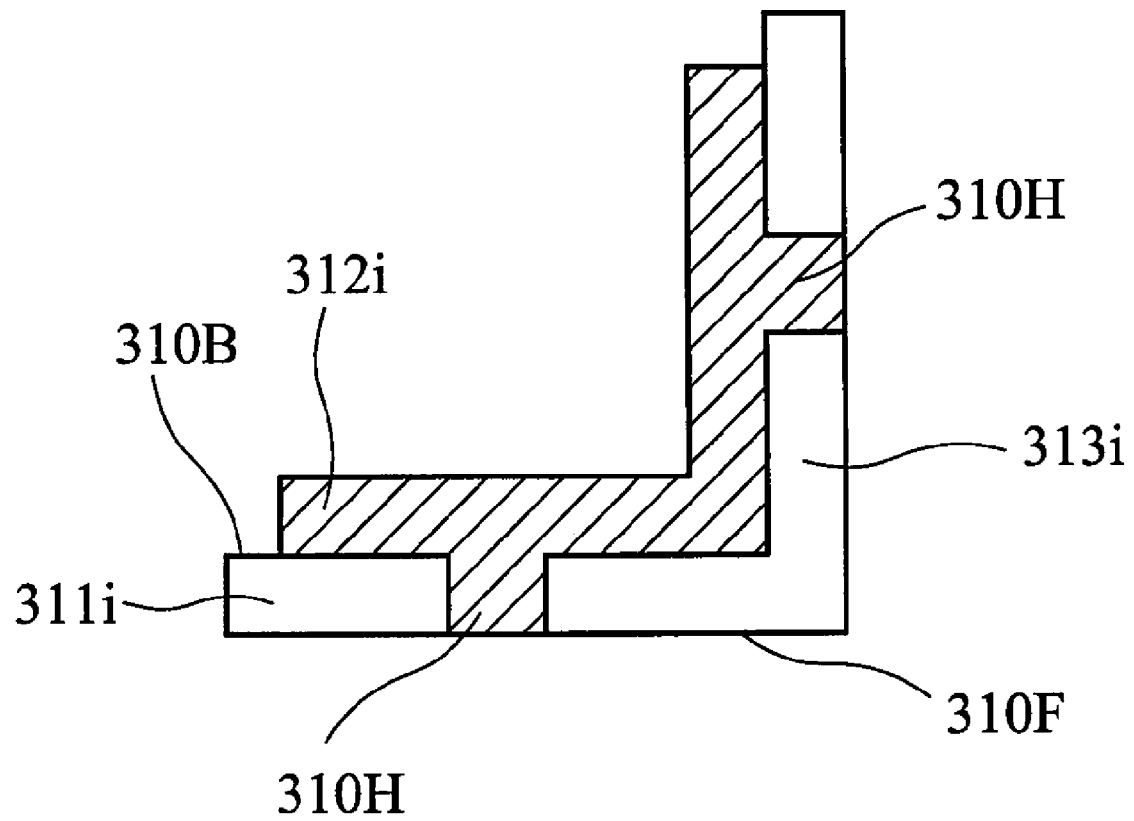

FIG. 5i depicts a cross sectional view of another modified front frame 310 having holes 310H. Buffer material 312i provided by injection molding is attached to the lower surface 310B of the front frame body 311i and extends to that of the side edge 313i. The front frame body 311i and the side edge 313i are respectively provided with at least one through hole 310H to increase the contact area between the buffer material 312i and the front frame body 311i as well as enhance the attachment.

Figure 6A:
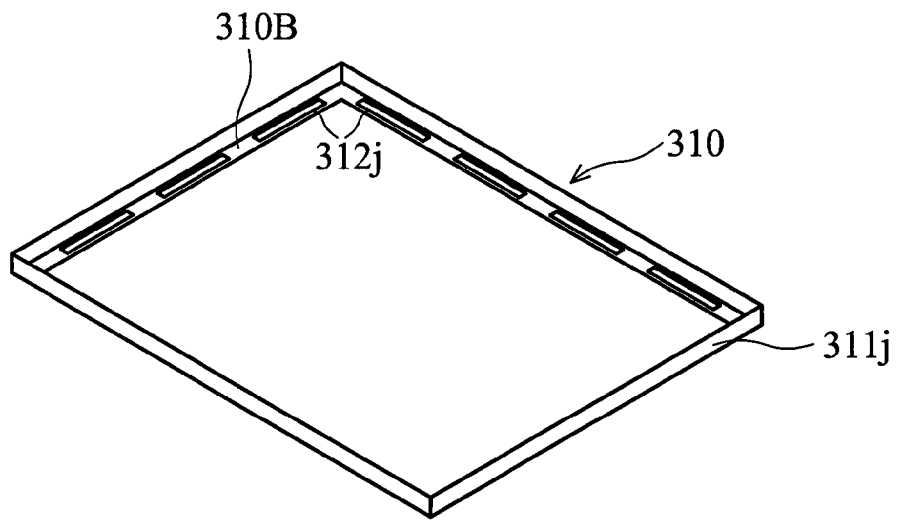
FIGS. 6a-6d show the front frame structure of various embodiments.
Figure 6B:
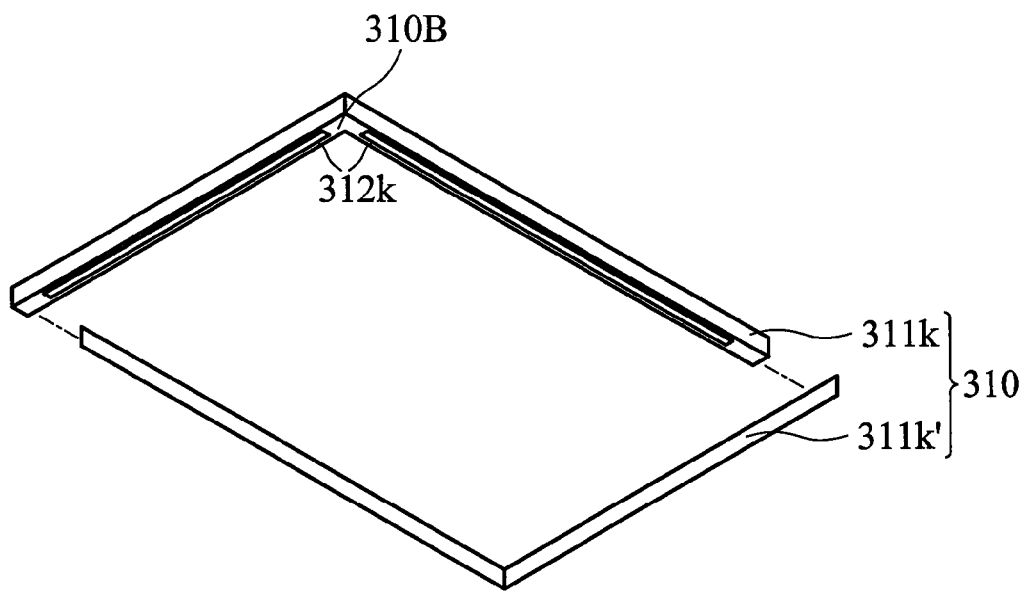
Figure 6C:
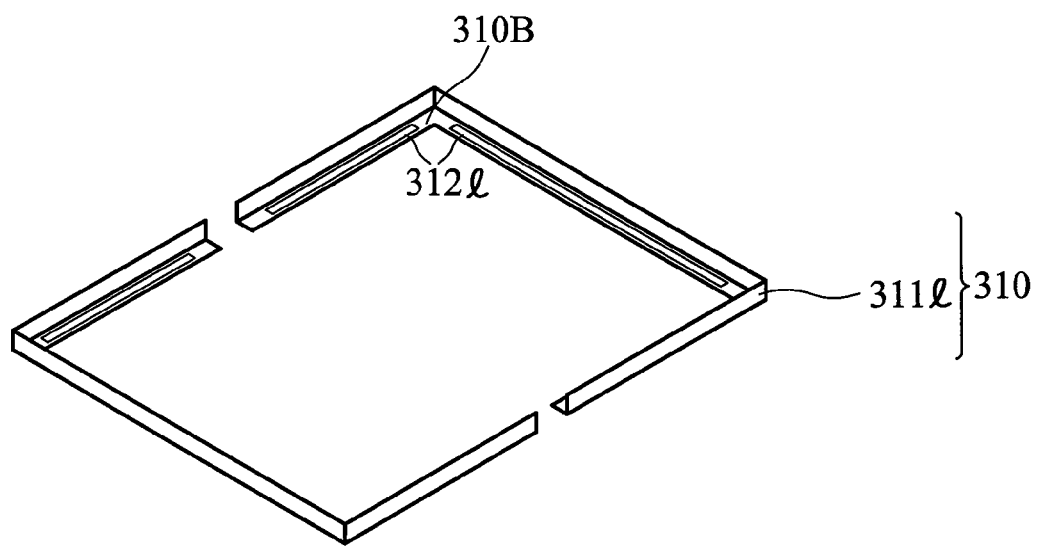

FIGS. 6a to 6c show some other embodiments of the front frame 310 of the invention. Referring to FIG. 6a, buffer material 312j is attached in a manner of section by section to the lower surface 310B of the front frame body 311j by injection molding.

FIG. 6b depicts another embodiment of the front frame 310. The front frame 310 includes two L-shaped front frame bodies 311k and 311k'. Buffer material 312k is attached to the lower surface 310B of the front frame bodies 311k and 311k' by injection molding, and then the front frame bodies 311k and 311k' are combined by soldering, screws or adhesives.

FIG. 6c depicts yet another embodiment of the front frame 310. The front frame 310 includes two U-shaped front frame bodies 311l. Buffer material 312l is attached to the lower surface 310B of the front frame body 311l by injection molding, and then the two U-shaped frame bodies 311l are combined by soldering, screws or adhesives.

Figure 6D:
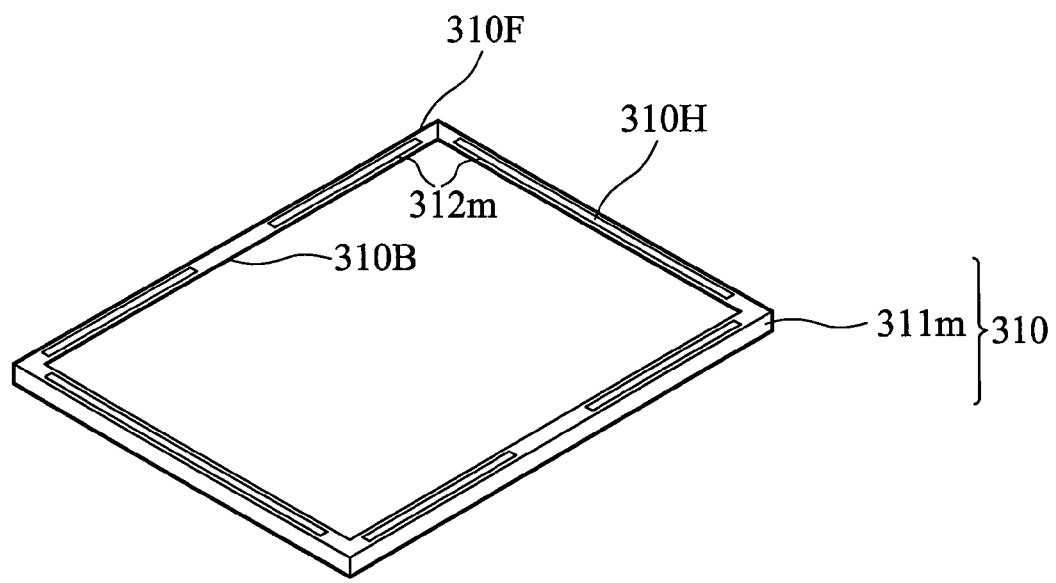

FIG. 6d depicts another embodiment of the front frame 310. Buffer material 312m is attached to the front frame body 311m by injection molding. The buffer material 312m has several portions and every portion is located in the hole 310H and on both the upper surface 310F and lower surface 310B of the front frame body 311m.

Figure 7A:
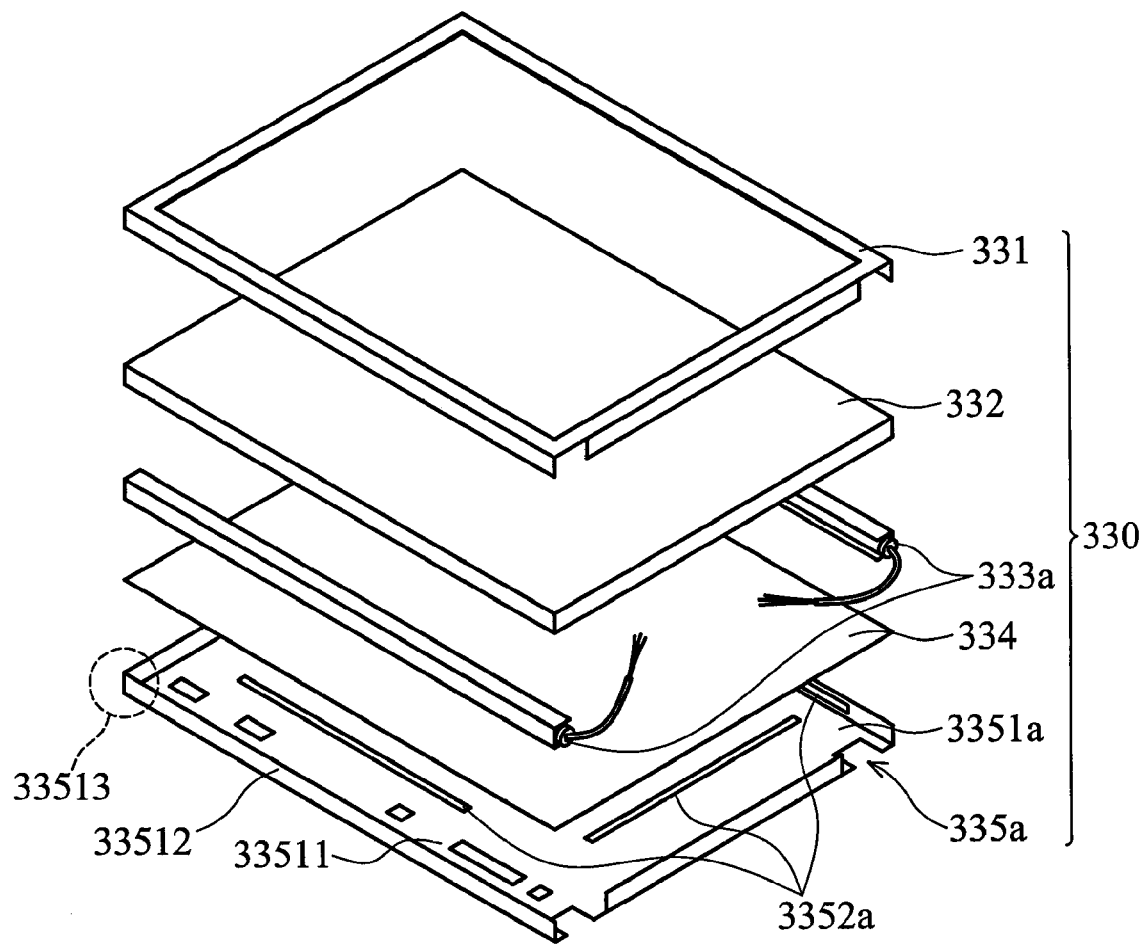
FIG. 7a is a schematic view showing the backlight structure according to an embodiment of the invention.
Figure 7B:
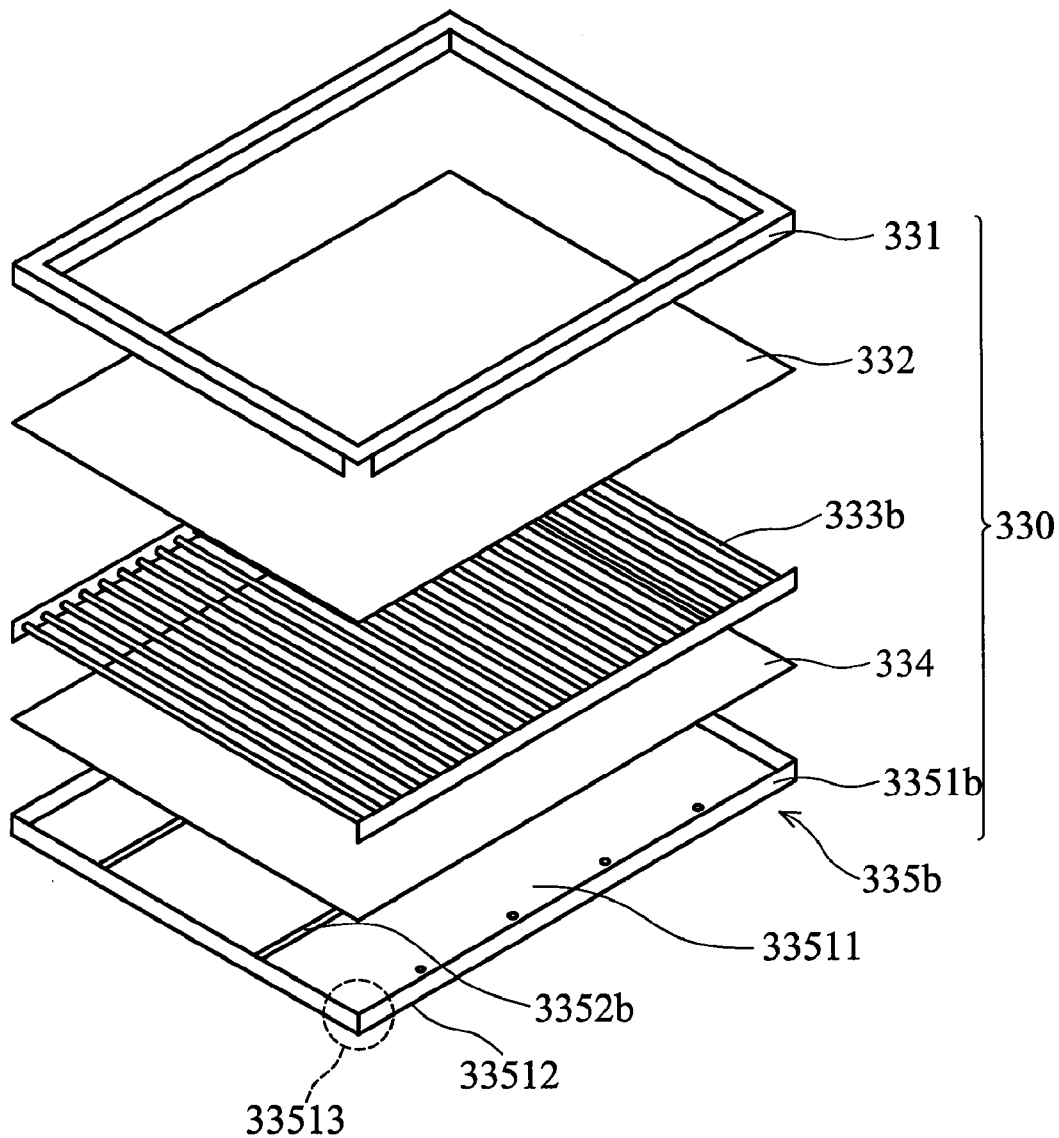
FIG. 7b is a schematic view showing the backlight structure according to another embodiment of the invention.

FIGS. 7a and 7b depict different embodiments of the backlight module of the invention. FIG. 7a depicts the edge type backlight module 330, wherein a frame body 331 is used to combine a light guide plate 332, light sources 333a, a reflection sheet 334, and a back bezel 335a. The light guide plate 332 is disposed in front of the light source 333a. The back bezel 335a has a back bezel body 3351a and a buffer material 3352a located on the back bezel body 3351a. The back bezel body 3351a includes a bottom plate 33511, a plurality of side edges 33512, and a plurality of corners 33513 wherein at least two side edges connect on one corner 33513.

FIG. 7b depicts the direct type backlight module 330, wherein a frame body 331 is used to combine a light guide plate 332, light sources 333b, a reflection sheet 334, and a back bezel 335b. The back bezel 335b has a back bezel body 3351b and a buffer material 3352b located on the back bezel body 3351b. The back bezel body 3351b includes a bottom plate 33511, a plurality of side edges 33512, and a plurality of corners 33513 wherein at least two side edges 33512 connect on one corner 33513.

Figure 8A:
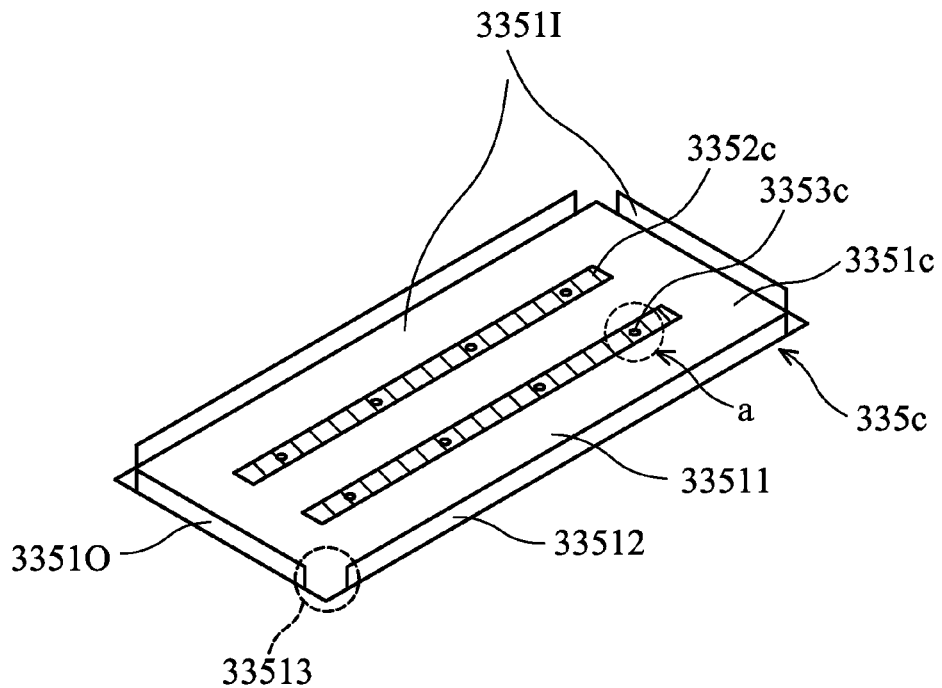
FIG. 8a is a schematic view showing the back bezel structure according to the first embodiment of the invention.
Figure 8B:
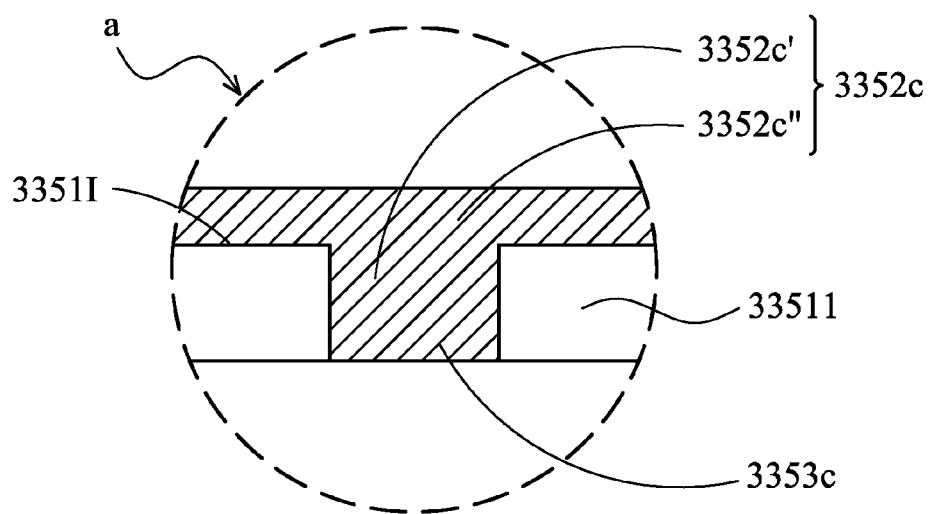

FIG. 8a depicts the first embodiment of the back bezel 335c of the backlight module 330 of the invention. FIG. 8b is a partially enlarged sectional view of the region a in FIG. 8a. The back bezel 335c includes a back bezel body 3351c and a buffer material 3352c. Buffer material 3352c is attached to the inner side 33511 rather than the outer side 33510 of the back bezel body 3351 c by injection molding. The back bezel body 3351c includes a bottom plate 33511, a plurality of side edges 33512, and a plurality of corners 33513 wherein at least two side edges 33512 may or may not connect on one corner 33513. The buffer material 3352c may be provided in strips. The back bezel body 3351c has at least one hole 3353c, a through hole, to increase the contact area between the buffer material 3352c and the back bezel body 3351c as well as enhance the attachment. Specifically, the buffer material 3352c includes a first portion 3352c' and a second portion 3352c". The first portion 3352c' is disposed in the hole 3353c. The second portion 3352c" is connected to the first portion 3352c' and disposed between the back bezel body 3351c and the light source 333a, as shown in FIG. 7a.

Figure 9A:
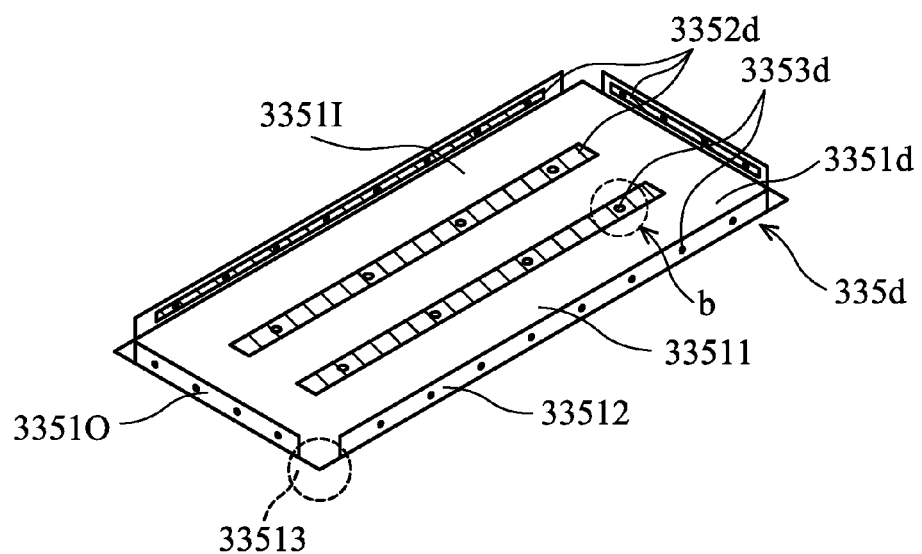
FIG. 9a is a schematic view showing the back bezel structure according to the second embodiment of the invention.
Figure 9B:
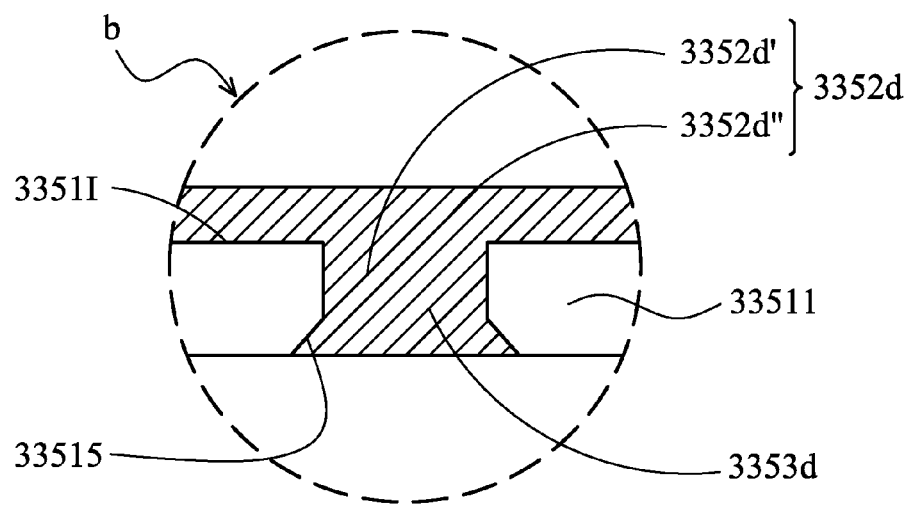

FIG. 9a depicts the second embodiment of the back bezel 335d of the backlight module 330 of the invention. FIG. 9b is a partially enlarged sectional view of the region b in FIG. 9a. The back bezel 335d includes a back bezel body 3351d and a buffer material 3352d. The back bezel body 3351d includes a bottom plate 33511, a plurality of side edges 33512, and a plurality of corners 33513 wherein at least two side edges 33512 may or may not connect on one corner 33513. Buffer material 3352d is attached to the inner sides 33511 of the bottom plate 33511 and side edges 33512 of the back bezel body 3351d by injection molding. Both the bottom plate 33511 and the side edges 33512 have at least one hole 3353d, a through hole with a bevel 33515, to increase the contact area between the buffer material 3352d and the back bezel body 3351d as well as enhance the attachment. Specifically, the buffer material 3352d includes a first portion 3352d' and a second portion 3352d". The first portion 3352d' is disposed in the hole 3353d. The second portion 3352d" is connected to the first portion 3352d' and disposed between the back bezel body 3351d and the light source 333a, as shown in FIG. 7a.

Figure 10:
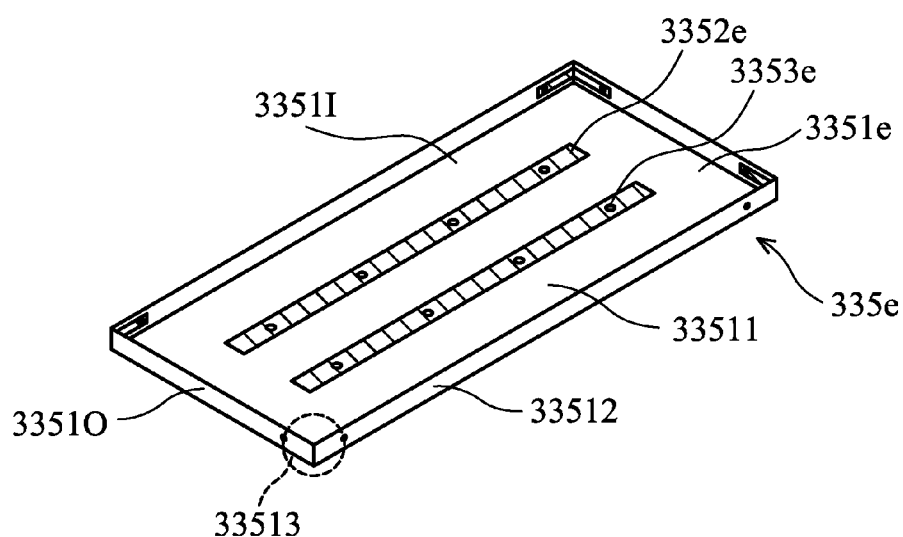
FIG. 10 is a schematic view showing the back bezel structure according to the third embodiment of the invention.

FIG. 10 depicts the third embodiment of the back bezel 335e of the backlight module of the invention. The back bezel body 3351e includes a bottom plate 33511, a plurality of side edges 33512, and a plurality of corners 33513 wherein at least two side edges 33512 connect on one corner 33513. Buffer material 3352e is attached to the inner sides 33511 of the bottom plate 33511 and corners 33513 of the back bezel body 3351e by injection molding. The back bezel body 3351e has at least one hole 3353e to increase the contact area between the buffer material 3352e and the back bezel body 3351e as well as enhance the attachment.

Figure 11:
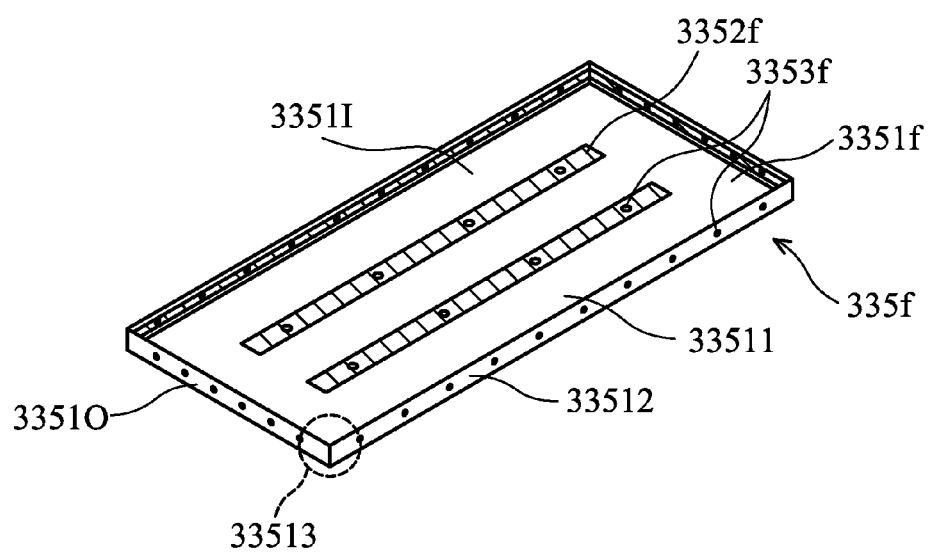
FIG. 11 is a schematic view showing the back bezel structure according to the fourth embodiment of the invention.

FIG. 11 depicts the fourth embodiment of the back bezel 335f of the backlight module of the invention. The back bezel body 3351f includes a bottom plate 33511, a plurality of side edges 33512, and a plurality of corners 33513 wherein at least two side edges 33512 connect on one corner 33513. Buffer material 3352f is attached to the inner sides 33511 of the side edges 33512, bottom plate 33511 and corners 33513 of the back bezel body 3351f by injection molding. The back bezel body 3351f has a plurality of holes 3353f to increase the contact area between the buffer material 3352f and the back bezel body 3351f as well as enhance the attachment.

Figure 12A:
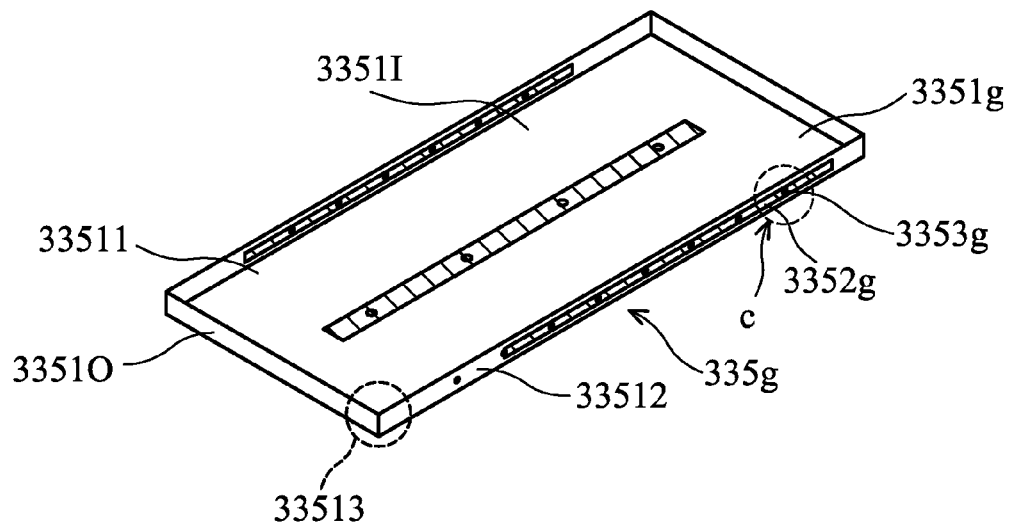
FIG. 12a is a schematic view showing the back bezel structure according to the first embodiment of the invention.
Figure 12B:
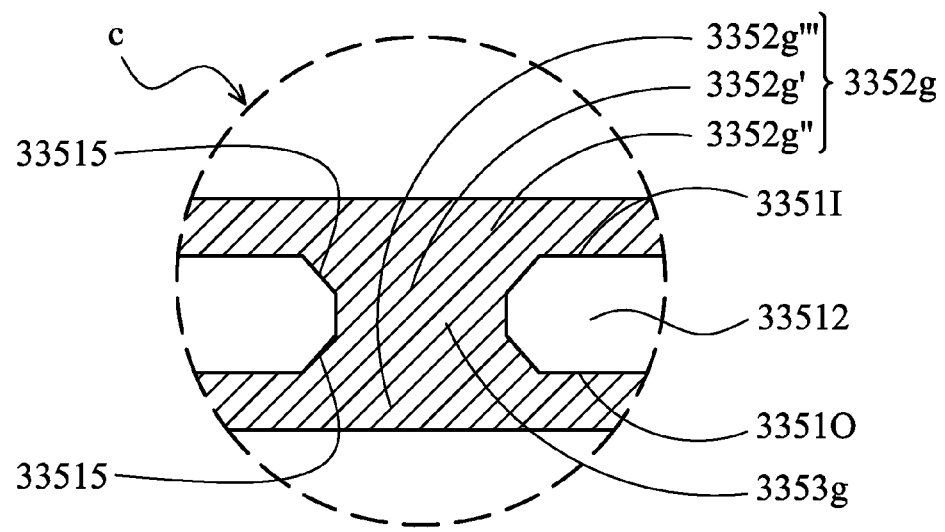

FIG. 12a depicts the fifth embodiment of the back bezel 335g of the backlight module 330 of the invention. FIG. 12b is a partially enlarged sectional view of the region c in FIG. 12a. The back bezel 335g includes a back bezel body 3351g and a buffer material 3352g. The back bezel body 3351g includes a bottom plate 33511, a plurality of side edges 33512, and a plurality of corners 33513 wherein at least two side edges 33512 connect on one corner 33513. Buffer material 3352g is attached to the inner sides 33511 of the side edges 33512 and bottom plate 33511 of the back bezel body 3351g by injection molding. The back bezel body 3351g has a plurality of holes 3353g, through holes with at least one bevel 33515, to increase the contact area between the buffer material 3352g and the back bezel body 3351g as well as enhance the attachment, wherein the buffer material 3352g is located in the holes 3353g and on both inner sides 33511 and outer sides 33510 of the back bezel body 3351g. Specifically, the buffer material 3352g includes a first portion 3352g', a second portion 3352g", and a third portion 3352g'". The first portion 3352g' is disposed in the hole 3353g. The second portion 3352g" is disposed on the inner side 33511 and connected to the first portion 3352g'. The third portion 3352g'" is disposed on the outer side 33510 and connected to the second portion 3352g" through the first portion 3352g'.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display device, comprising:
   a backlight module;
   a liquid crystal array cell module disposed in front of the backlight module; and
   a front frame including a front frame body and a buffer material, wherein the front frame body has at least one hole, the hole is a through hole with at least one bevel, the buffer material includes a first portion and a second portion, the first portion is disposed in the hole, the front frame connects the liquid crystal array cell module and the backlight module, and the second portion is connected to the first portion and disposed between the front frame body and the liquid crystal array cell module.

2. The liquid crystal display device as claimed in claim 1, wherein the front frame body includes a plurality of side edges and corners where the side edges connect.

3. The liquid crystal display device as claimed in claim 2, wherein the first portion is disposed on the side edges of the front frame body.

4. The liquid crystal display device as claimed in claim 2, wherein the first portion is disposed on the corners of the front frame body.

5. The liquid crystal display device as claimed in claim 2, wherein the first portion is disposed on the side edges and the corners of the front frame body.

6. The liquid crystal display device as claimed in claim 1, wherein the front frame body includes an upper surface and a lower surface, and the lower surface faces the liquid crystal array cell module.

7. The liquid crystal display device as claimed in claim 6, wherein the buffer material further includes a third portion disposed on the upper surface of the front frame body and connected to the second portion through the first portion.

8. A method for fabricating a liquid crystal display device, comprising:
   forming a buffer material on a front frame by injection molding, wherein the front frame has at least one hole, the hole is a through hole with at least one bevel, the buffer material is disposed in the hole; and
   connecting the front frame, a liquid crystal array cell module, and a backlight module, wherein the buffer material is sandwiched between the front frame and the liquid crystal array cell module.

9. A backlight module, comprising:
   a light source;
   a light guide plate disposed in front of the light source; and
   a back bezel including a back bezel body and buffer material, wherein the back bezel body has at least one hole, the hole is a through hole with at least one bevel, the buffer material comprises a first portion and a second portion, the first portion is disposed in the hole, the back bezel connects the light source and the light guide plate, and the second portion is connected to the first portion and disposed between the back bezel body and the light source.

10. The backlight module as claimed in claim 9, wherein the back bezel includes a bottom plate, a plurality of side edges and corners where the side edges connect.

11. The backlight module as claimed in claim 10, wherein the first portion is disposed on the side edges of the back bezel.

12. The backlight module as claimed in claim 10, wherein the first portion is disposed on the corners of the back bezel.

13. The backlight module as claimed in claim 10, wherein the first portion is disposed on the bottom plate of the back bezel.

14. The backlight module as claimed in claim 10, wherein the first portion is disposed on the side edges and corners of the back bezel.

15. The backlight module as claimed in claim 10, wherein the first portion is disposed on the side edges and bottom plate of the back bezel.

16. The backlight module as claimed in claim 10, wherein the first portion is disposed on the corners and bottom plate of the back bezel.

17. The backlight module as claimed in claim 10, wherein the first portion is disposed on the side edges, corners and bottom plate of the back bezel.

18. The backlight module as claimed in claim 9, wherein the back bezel includes an inner surface and an outer surface, and the inner surface faces the light source and light guide plate.

19. The backlight module as claimed in claim 9, wherein the buffer material further comprises a third portion disposed on an outer surface of the back bezel and connected to the second portion through the first portion.

20. A method for fabricating a backlight module, comprising:
   forming a buffer material on a back bezel of the backlight module by injection molding, wherein the back bezel has at least one hole, the hole is a through hole with at least one bevel, the buffer material is disposed in the hole;
   connecting a light guide plate, a light source module, and the back bezel, wherein the buffer material is sandwiched between the back bezel and the light source module.

21. A liquid crystal display device, comprising:
   a backlight module;
   a liquid crystal array cell module disposed in front of the backlight module; and
   a front frame including a front frame body and a buffer material, wherein a surface, contacting the buffer material, of the front frame body is roughened, and the front frame connects the liquid crystal array cell module and the backlight module.

* * * * *